(12) United States Patent
El Choubassi et al.

(10) Patent No.: US 8,872,851 B2
(45) Date of Patent: Oct. 28, 2014

(54) AUGMENTING IMAGE DATA BASED ON RELATED 3D POINT CLOUD DATA

(75) Inventors: Maha El Choubassi, San Jose, CA (US); Igor V. Kozintsev, San Jose, CA (US); Yi Wu, San Jose, CA (US); Yoram Gat, Palo Alto, CA (US); Horst Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 12/890,251

(22) Filed: Sep. 24, 2010

(65) Prior Publication Data

US 2012/0075342 A1    Mar. 29, 2012

(51) Int. Cl.
*G09G 5/00* (2006.01)
*G06T 7/00* (2006.01)
*G06T 17/00* (2006.01)
*G06T 11/00* (2006.01)

(52) U.S. Cl.
CPC ..... *G06T 7/0081* (2013.01); *G06T 2207/10028* (2013.01); *G06T 17/00* (2013.01); *G06T 11/00* (2013.01); *G06T 2210/56* (2013.01)
USPC ...................................................... 345/633

(58) Field of Classification Search
USPC ................................................. 345/629–641
See application file for complete search history.

(56) References Cited

U.S. PATENT DOCUMENTS

| | | | |
|---|---|---|---|
| 7,583,275 B2 * | 9/2009 | Neumann et al. | 345/633 |
| 8,340,400 B2 * | 12/2012 | Lukas et al. | 382/154 |
| 2006/0221072 A1 | 10/2006 | Se et al. | |
| 2011/0279445 A1 * | 11/2011 | Murphy et al. | 345/419 |

FOREIGN PATENT DOCUMENTS

| | | |
|---|---|---|
| WO | WO-2008112806 | 9/2008 |
| WO | WO-2010099036 | 9/2010 |

OTHER PUBLICATIONS

Wendt et al., Markerless Outdoor Localisation Based on SIFT Descriptors for Mobile Applications, ICISP 2008, Lecture Notes in Computer Science 5099, 2008, pp. 439-446.*
Takacs et al., Outdoors Augmented Reality on Mobile Phone Using Loxel-Based Visual Feature Organization, Proceedings of the 1st ACM International Conference on Multimedia Information Retrieval, 2008, pp. 427-434.*

(Continued)

*Primary Examiner* — Xiao Wu
*Assistant Examiner* — Charles Tseng
(74) *Attorney, Agent, or Firm* — Blakely, Sokoloff, Taylor & Zafman LLP

(57) ABSTRACT

Embodiments of the invention describe processing a first image data and 3D point cloud data to extract a first planar segment from the 3D point cloud data. This first planar segment is associated with an object included in the first image data. A second image data is received, the second image data including the object captured in the first image data. A second planar segment related to the object is generated, where the second planar segment is geometrically consistent with the object as captured in the second image data. This planar segment is generated based, at least in part, on the second image data, the first image data and the first planar segment. Embodiments of the invention may further augment the second image data with content associated with the object. This augmented image may be displayed such that the content is displayed geometrically consistent with the second planar segment.

22 Claims, 9 Drawing Sheets

(56) References Cited

OTHER PUBLICATIONS

Gausemeier et al., Development of a Real Time Image Based Object Recognition Method for Mobile AR-Devices, Proceedings of the 2nd International Conference on Computer Graphics, Virtual Reality, Visualisation and Interaction in Africa, 2003, pp. 133-139.*

Leotta et al., Plausible Physics in Augmented Images, ACM SIG-GRAPH 2005 Posters, Article No. 53, 2005.*

Alshawa et al., Acquisition and Automatic Extraction of Façade Elements on Large Sites from a Low Cost Laser Mobile Mapping System, ISPRS, 3D-ARCH 2009, Feb. 2009.*

Reitmayr et al., Semi-Automatic Annotations in Unknown Environments, 6th IEEE and ACM International Symposium on Mixed and Augmented Reality, Nov. 2007.*

International Search Report and Written Opinion of the International Searching Authority for Application No. PCT/US2011/053271, (Mar. 28, 2012), Whole Document.

"International Preliminary Report on Patentability (Chapter I of the Patent Cooperation Treat) for International Application. No. PCT/US2011/053271", (Apr. 4, 2013), Whole Document.

* cited by examiner

AUGMENTING IMAGE DATA BASED ON RELATED 3D POINT CLOUD DATA

FIELD

Embodiments of the invention generally pertain to mobile computing devices and more specifically to augmenting captured images with related content.

BACKGROUND

Mobile computing devices typically include cameras, location and orientation sensors, and increasingly powerful computational resources. Mobile computing devices are also able to establish high bandwidth connections to utilize cloud computing infrastructures and service providers.

Displays included in mobile computing devices may be used as a live viewfinder, allowing device users to capture real-time image data (e.g., pictures, videos); however, most applications fail to utilize the computational resources available to the mobile computing device to provide users with additional information relevant to the subject matter within the live view displayed (i.e., the viewfinder). The limited number of applications that to attempt to enhance the live view are limited to displaying basic information such as the distance between the user and a certain location, or basic information about the user's surroundings (e.g., types of business within the live view).

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention relate to systems, apparatuses and methods to provide image data, augmented with related data, to be displayed on a mobile computing device. Embodiments of the invention describe processing a first image data and 3D point cloud data to extract a first planar segment from the 3D point cloud data. This first planar segment is associated with an object included in the first image data. A second image data is received (e.g., captured via an image sensor included in a mobile computing device), the second image data including the object captured in the first image data. A second planar segment related to the object is generated, where the second planar segment is geometrically consistent with the object as captured in the second image data. As described below, this planar segment is generated based, at least in part, on the second image data, the first image data and the first planar segment.

Embodiments of the invention may further augment the second image data with content associated with the object (such as text, images or videos, or some 3D structure). This augmented content may be displayed, for example, on a display included in the mobile computing device, where the content is displayed geometrically consistent with the second planar segment.

Figure 1:
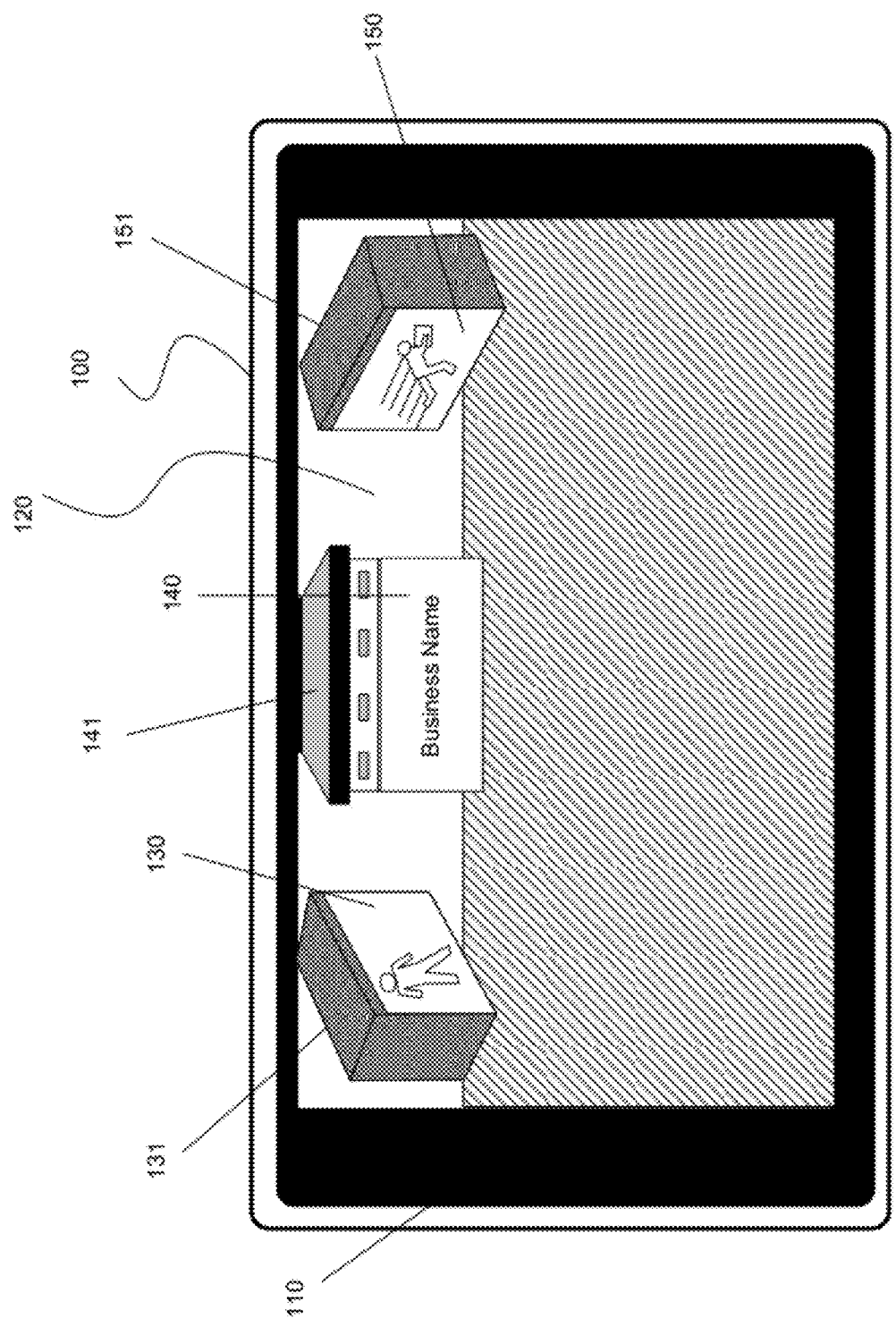
FIG. 1 illustrates an example of an augmented 3D view displayed on a mobile computing device according to an embodiment of the invention.

FIG. 1 illustrates an example of an augmented 3D view displayed on a mobile computing device according to an embodiment of the invention. Mobile computing device 100 includes display 110. Device 100 may be any portable computing system, such as a laptop computer, a tablet computer, a smartphone, a hand-held computing device, a vehicle computing system, etc.

In this example, display 110 includes real-time view 120 of a user's surroundings via an image sensor (e.g., a camera) included in device 100 (not shown). It is to be understood that by displaying real-time view 120, device 100 may function as a viewfinder displaying image data (e.g., pictures, video) to allow a user to observe the target of the device's image sensor.

In this embodiment, real-time view 120 is augmented with planar segments 130, 140 and 150. The planar segments 130, 140 and 150 correspond to objects identified within view 120. In this example, planar segments 130, 140 and 150 correspond to buildings 131, 141 and 151 within view 120.

Planar segments 130, 140 and 150 are extracted from 3D information related to view 120 through processes described below. Each planar segment is geometrically consistent a surface plane of their respective objects in real-time view 120 (i.e., in this example, consistent with the front sides of buildings 131, 141 and 151 as seen in display 110).

In this embodiment, planar segments 130, 140 and 150 include data related to their respective objects in real-time view 120. Planar segment 130 includes an image related to the building (in this example, a picture of the user in building 131). Planar segment 140 includes text data related to a business operating in building within the least one planar segment on a display of the mobile computing device. In this example, said text data identifies the business included in building 141. Planar segment 150 includes video data captured within building 151. The augmented content included in each of the planar segments are geometrically consistent with their respective planar segments (i.e., geometrically consistent with the surface plane of their respective objects in real-time view 120). Said augmented content may, for example, be included in memory storage of device 100, or obtained from a database via a network connection (e.g., wireless internet connection).

Figure 2:
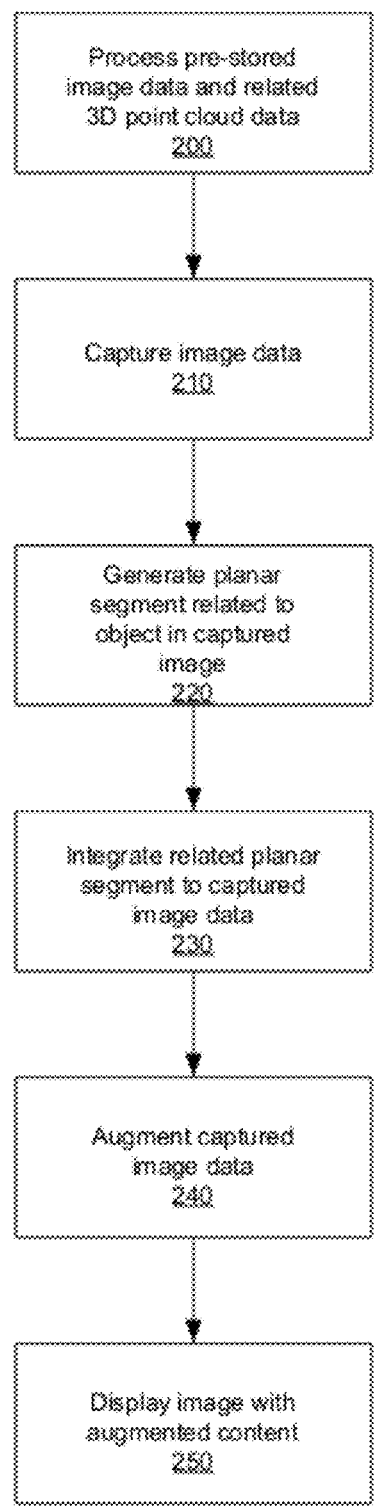
FIG. 2 is a flow diagram of a process according to an embodiment of the invention.

FIG. 2 is a flow diagram of a process according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Image data (alternatively referred to herein as "pre-stored" image data so as to differentiate the data from the image data captured by the mobile computing device) and 3D point cloud data corresponding to the image data are processed to extract at least one planar segment, 200. In some embodiments, as described below, this 3D point cloud data is pre-processed in order to make the data more suitable for subsequent operations (e.g., the data is downsampled based on the resolution of the captured image data or the computational resources available on the mobile computing system).

In one embodiment, the pre-stored image data is a picture of at least one object. The extracted planar segment is associated with the object. For example, as described above, the pre-stored image data may include an image of a building, and the extracted planar segment will be a plane of the building.

Image data of the object is captured via an image sensor included in a mobile computing device, 210. It is to be understood that the captured image data may include a static picture, video data, or real-time display data of the target of the image sensor (e.g., the live view of FIG. 1)

A second planar segment is generated, the second planar segment related to the object in the captured image, 220. This planar segment is geometrically consistent with the object as it appears in the captured image data (e.g., a side of a building included in the captured live view, as described in FIG. 1). The second planar segment may be generated based, at least in part, on the captured image data, the pre-stored image data described in operation 200, and the at least one planar segment described in operation 200.

The second planar segment is integrated (alternatively referred to herein as registered) with the captured image data, 230. In one embodiment, the captured image data is related to a live-view of a mobile computing device, and thus the at least one planar segment is integrated with the live view.

The captured image data is augmented with additional content within the second planar segment, 240. The additional content is related to the respective object represented by the at least one planar segment. It is to be understood that the additional content will be displayed within the augmented image geometrically consistent with the second the planar segment, 250.

Figure 3:
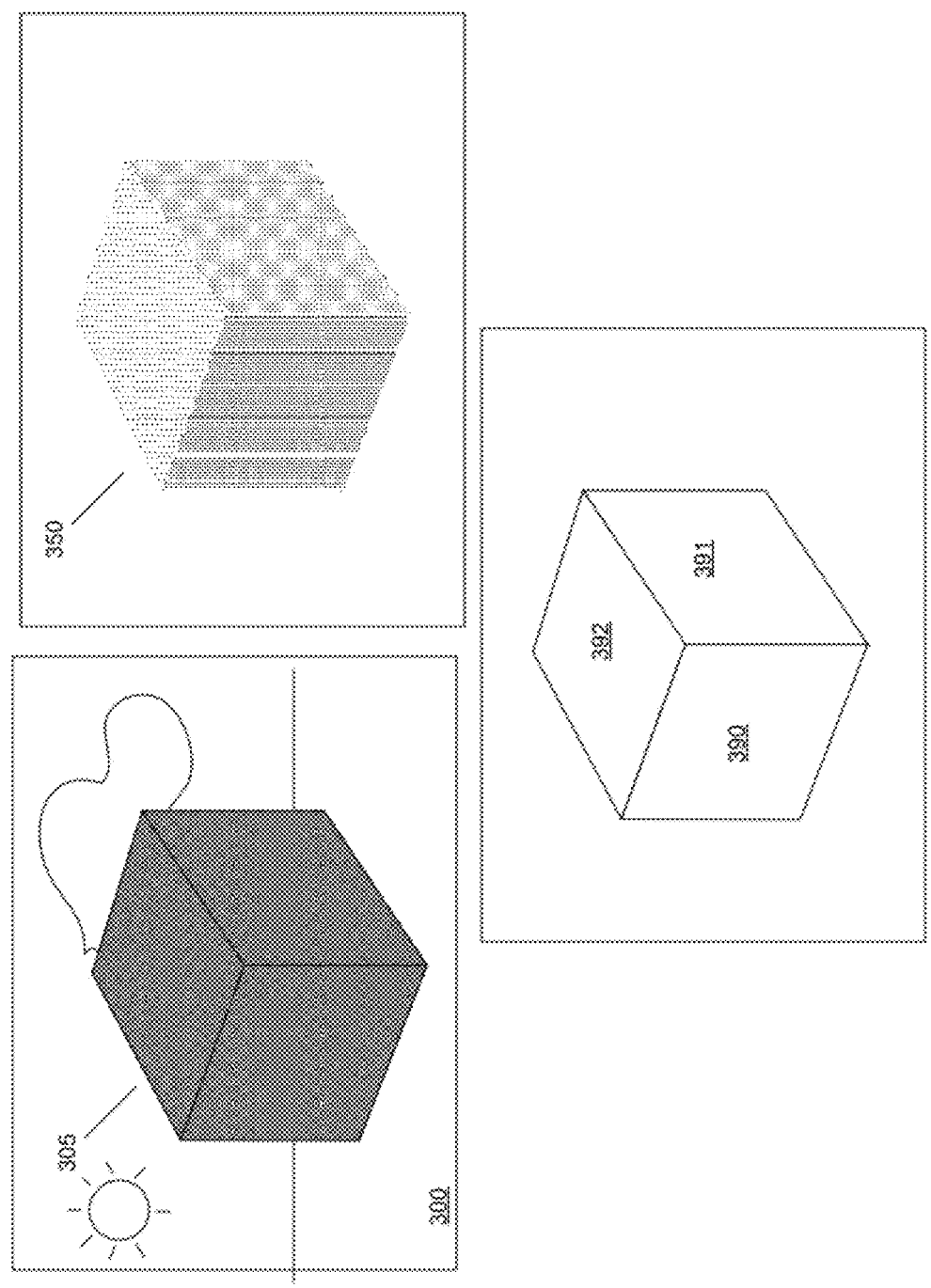
FIG. 3 illustrates image data, 3D point cloud data and planar segments that may be processed by embodiments of the invention.

FIG. 3 illustrates image data, 3D point cloud data and planar segments that may be processed by embodiments of the invention. 3D point cloud 350 corresponds to pre-stored 2D image 300 of building 305. Each 3D point in cloud 350 represents the actual 3D location of a pixel of image 300. Some pixels in image 300 may not have a corresponding 3D point, e.g., pixels in the sky.

In some embodiments 3D point cloud data 350 is transformed into a coordinate system more suitable for subsequent processing. For example, if 3D point cloud data 350 is in the format of "latitude, longitude, and altitude," it may be more useful to transform the format to a local coordinate system such as east, north, and up (ENU), so the values of the coordinates are smaller (i.e., compared to coordinates in a system with the center of the earth as the origin). This transformation may also better convey the vertical and horizontal orientations of 3D point cloud data 350.

In some embodiments, 3D point cloud data 350 results from a larger set of 3D point cloud data sub-sampled to make computation faster. This may be accomplished by downsampling the pre-stored image or the corresponding 3D point cloud. For example, for a 300×500 image, the size of the corresponding 3D point cloud data may consist of up to 150,000 points. By sampling the image at a rate 10 in both horizontal and vertical dimensions, the number of 3D points may be reduced to 1,500 points.

Figure 4:
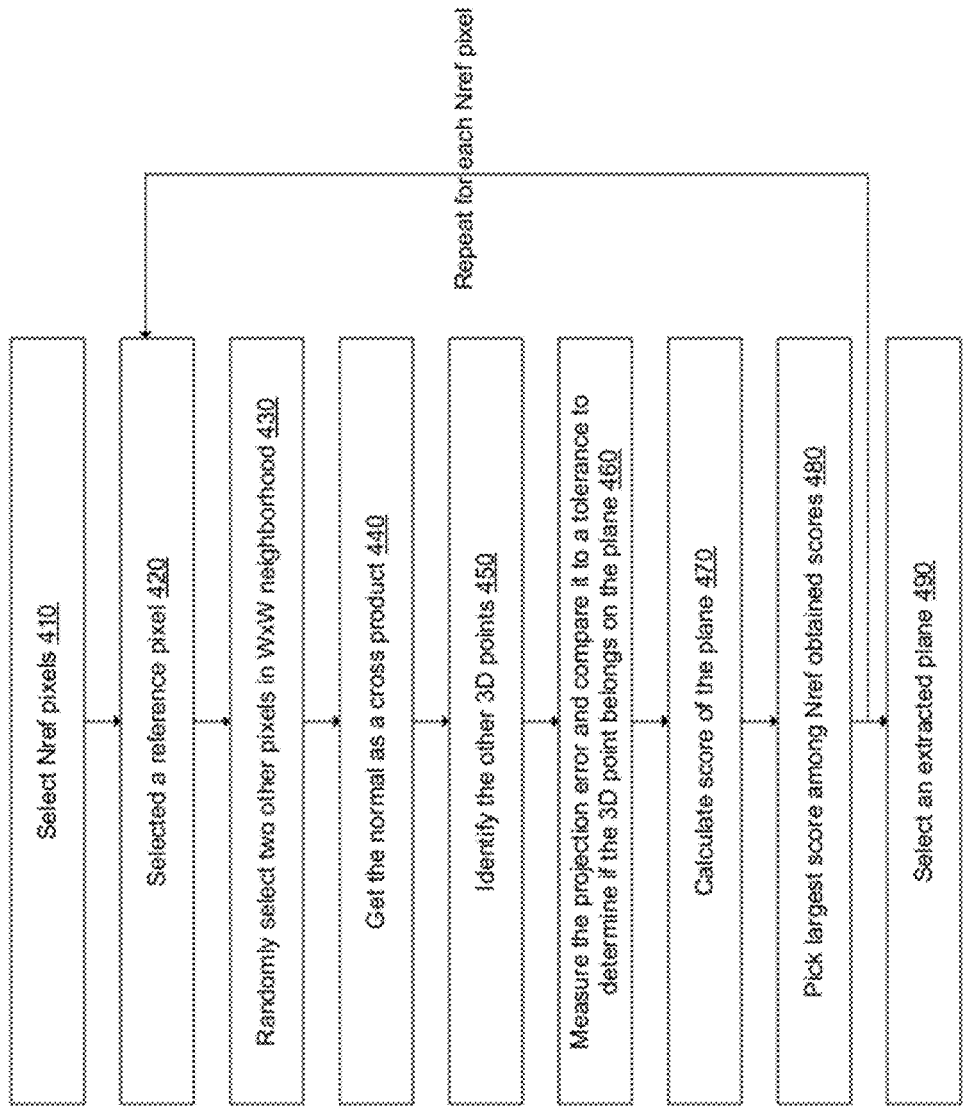
FIG. 4 is a flow diagram for processing 3D point cloud data and extracting planar segments according to an embodiment of the invention.

In order to extract the planes from 3D point cloud data 350, embodiments of the invention may adopt a random sample consensus (RANSAC) approach and combine both pre-stored image 300 and 3D point cloud data 350 to guide the sampling process in RANSAC rather than arbitrarily sampling the 3D point cloud data. FIG. 4 is a flow diagram for processing 3D point cloud data and extracting planar segments according to an embodiment of the invention.

Nref pixels from an image are randomly selected, 410. A series of operations are executed for each pixel, (i.e., a reference pixel is selected, 420). These operations are described below.

In a local neighborhood, i.e., a W×W window around the reference pixel, two other pixels are randomly selected such that the three pixels are noncollinear, 430. The normal Nref in IR3 to the plane (Pref) formed by the 3D points corresponding to the three pixels is computed as a cross-product, 440. For this operation, it may be presumed that 3D points corresponding to neighboring pixels are more likely to lie on the same plane. Thus, it is to be understood that by applying this locality constraint to detect coplanar 3D points, the processing according to the embodiment converges to the dominant planes faster compared to arbitrarily sampling the 3D point cloud data.

For each 3D point, (herein referred to as point M in IR3), it is determined if it lies on the plane (Pref) and its projection error on plane (Pref: E=[nref.(M−Mref)]2) is computed, where Mref is the 3D point corresponding to the reference pixel, 450. If the error E is less than the tolerance threshold $\epsilon$, i.e., E<$\epsilon$, then point M is presumed to lie on the plane (Pref), 460.

The score of the plane (Pref) is then computed, as the normalized number of 3D points "belonging" to it: scoreref=|{M in (Pref)}|/N, where N is the total number of points in the 3D point cloud data, 470.

The largest score among the Nref obtained scores is selected, 480. If it is larger than a threshold L, i.e., scoreref>L, the plane (Pref) is selected as an "extracted" plane, and the least squares estimate of its normal vector and bias is obtained, 490. All the points M that "belong" to the extracted plane, i.e., whose projection error to this plane is less than the tolerance c, from the 3D point cloud, may be eliminated from subsequent processing.

Figure 5:
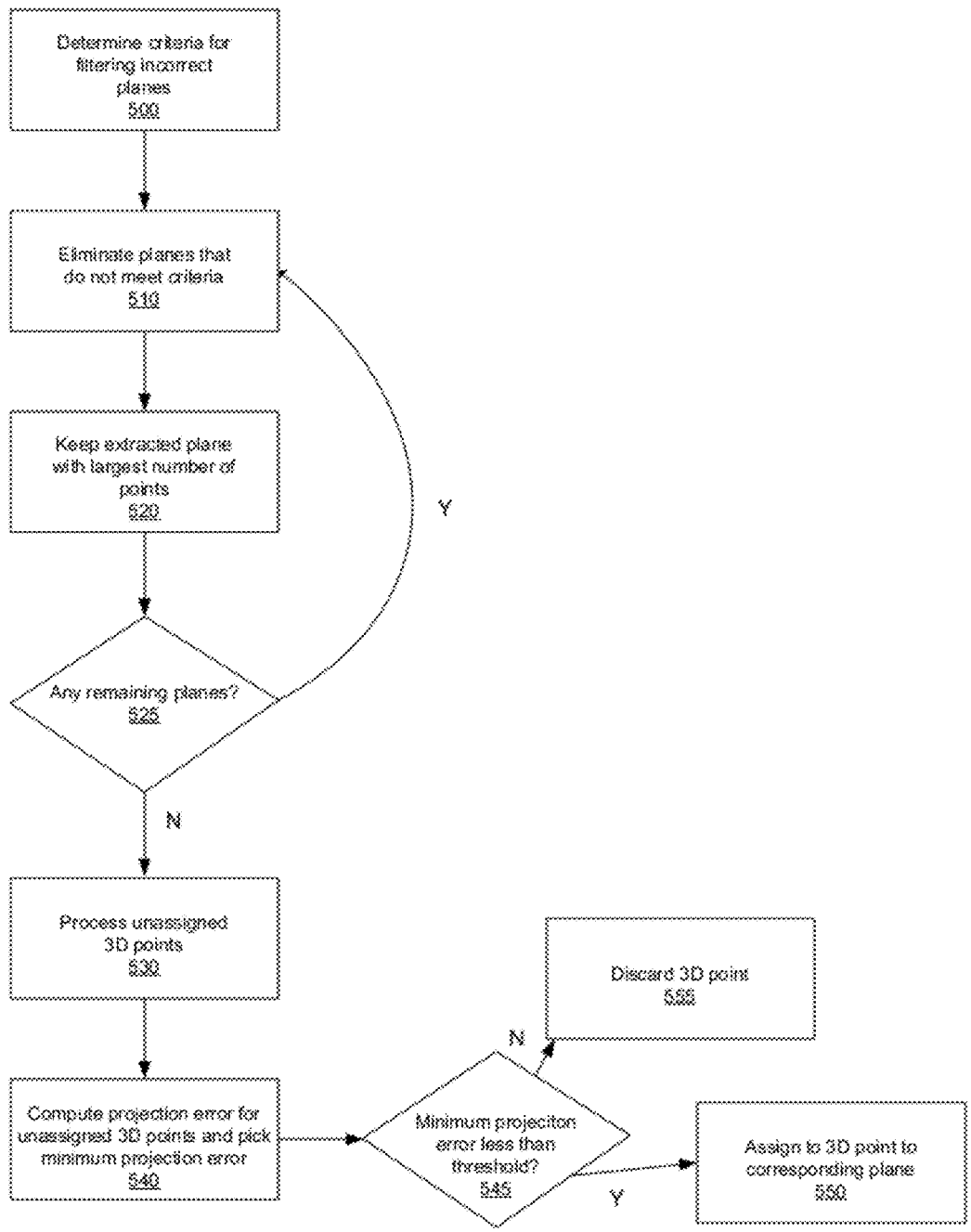
FIG. 5 is a flow diagram of a process to refine extracted planes according to an embodiment of the invention.

Once all planes have been extracted, and assuming more than one plane has been extracted, embodiments of the invention may further refine the extracted planes. FIG. 5 is a flow diagram of a process to refine extracted planes according to an embodiment of the invention.

Data related to a pre-stored image may be used to determine criteria for filtering incorrect planes, 500. For example, in urban scenes, buildings are typically the dominant structures. Hence, for the purpose of obtaining rough 3D models, if the pre-stored image is known to be of an urban scene, then most of the planes may be presumed to likely be either vertical or horizontal.

Planes that do not meet the filtering criteria are eliminated, 510. Thus, in this example, extracted planes that are neither vertical nor horizontal are eliminated and 3D points that belong to them are not assigned to any plane.

Each non-eliminated plane may also be compared to similarly processed planes, i.e., planes with similar normal vectors and biases, and only the extracted plane with the largest number of points is kept, 520.

If there are no remaining planes left to be processed, 525, the remaining 3D points that are not assigned to any plane are processed, 530. For each remaining unassigned 3D point, its projection error to each refined extracted plane is computed and the minimum projection error and the corresponding plane (Pmin) are selected, 540. The tolerance threshold may be increased from $\epsilon$ to $\epsilon'=factor\times\epsilon$. If the minimum projection error is less than $\epsilon'$, 545, the 3D point is assigned to the corresponding plane (Pmin), 550; otherwise it is discarded, 555. For example, the resulting extracted planes for 3D point cloud data 350 would be planes 390, 391 and 392.

Figure 6:
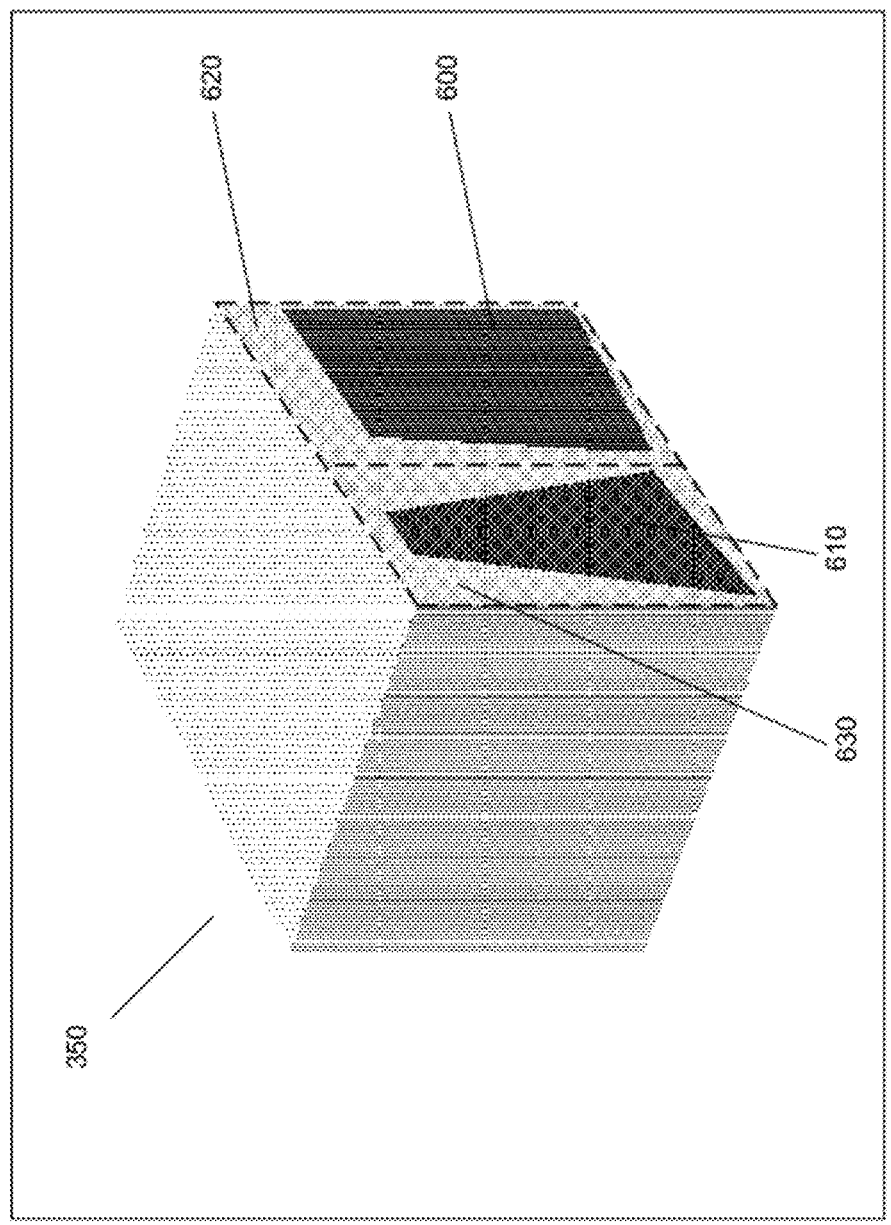
FIG. 6 illustrates clustering planar segments according to an embodiment of the invention.

Thus, the result of the example process described by FIG. 5 may be a mask of the 3D point cloud data that maps each 3D point and its corresponding pixel to a plane. This mask may used to create a more compact and higher level representation of the captured image data. In FIG. 3, most of the 3D points/pixels of the right wall of building 305 are the same color (e.g., green, although not illustrated in color in the figure). Instead of saving this data as pairs of 3D points/pixels and the corresponding plane indices, embodiments of the invention may specify the overall area occupied by the green-coded pixels on the right wall (for example, determining the bounding polygon). Furthermore, the areas that are far apart from each other and within the same plane may be clustered. Higher level information regarding building 305 may be obtained to appropriately cluster planes. For example, the same-colored pixels may be clustered into the separate clusters corresponding to two different sections of the right wall of building 305 as illustrated in FIG. 6.

In this embodiment, 3D point cloud data 350 includes clusters 600 and 610 corresponding to the right wall of building 350 (as illustrated in FIG. 3). High level information may be used to determine there is an advertising plate on said wall. Embodiments of the invention may thus cluster planar segments according to each segment of wall—i.e., cluster 600 is grown into planar segment 620 (corresponding to the wall) and cluster 610 is grown into planar segment 630 (corresponding to the advertising plate).

For the case of buildings, the desired end result could be a set of bounding rectangles of the buildings walls. If the 3D point cloud data and the pre-stored image is related to an urban area, is can be assumed that most 3D points that belong to vertical planes correspond to walls of buildings. Hence, the goal to approximate the vertical planar segments by rectangles is justified.

In one embodiment of the invention, the information both in the image and the 3D point cloud data is leveraged to cluster planes by using region growing in the 3D point cloud. The similarity distance between two 3D points is the distance in pixels between the corresponding pixels. Processing operations may iterate over each plane, pick a number n of seeds, and grows planar segments around them.

Figure 7:
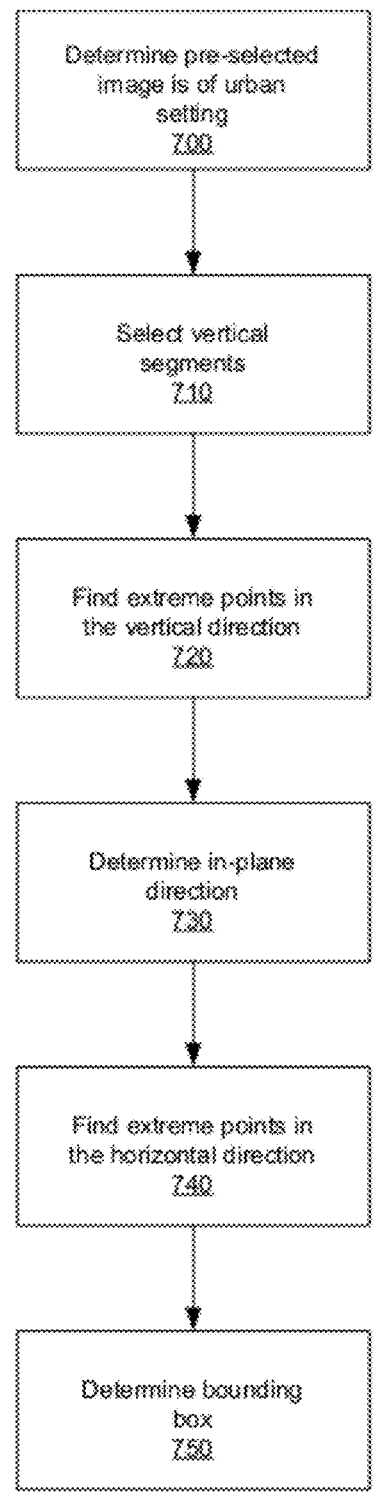
FIG. 7 is a flow diagram of a process to bound planar segments according to an embodiment of the invention.

FIG. 7 is a flow diagram of a process to bound planar segments according to an embodiment of the invention. Process 700 is executed to the segments in a cluster related to an urban setting as described above. Continuing to apply embodiments of the invention to a known urban setting image as an example, vertical segments are selected, 710. For each vertical segment, the two extreme 3D points with the maximum and minimum vertical coordinates are found, 720. Thus, the upper and lower horizontal edges of the bounding box are obtained, and the in-plane direction may be determined based on these points, 730. The other two extreme 3D points that have maximum and minimum coordinates in the horizontal direction within the segment are also found, 740. Using these extreme points and the in-plane direction, the two vertical edges of the bounding box of this segment may be determined, 750.

In some embodiments, multiple 2D images of an object or scene of various view angles may be pre-stored along with and corresponding 3D point cloud data sets from different view angles. These point cloud data sets may overlap. In these embodiments, all point cloud data may be merged to improve the accuracy of extracted planar segments. To identify the overlapping regions, the sets of point cloud data may be restricted to a local neighborhood, and related point cloud information may be merged.

Is it to be understood that the various tasks of extracting planes, combining point cloud data, and noise removal may be performed in different orders via different processes. In one embodiment, each point cloud data set is modeled as a set of noisy measurements (the sources of noise may include uncertainty of the point of measurement, its orientation, sensor noise, etc) of the actual 3D points. An estimate of the noise statistics and the original 3D points in the overlapping regions may then be obtained. These noise statistics may be utilized to obtain better estimates of the 3D points for all point cloud data sets in order to extract the planes. It is to be understood that the 3D points in the region of overlap have the most accurate estimates, and thus these points may be given priority in estimating the planes to which they belong (for example weighted least squares may be used for an estimation of the plane parameters with more weights assigned to these points).

In another embodiment, plane extraction is executed for each 3D point cloud data set separately. Overlapping planes may be indentified based on their normal vectors similarities and their local proximity. For each set of overlapping planes, all the 3D point cloud data belonging to them may be collected in order to make a new (i.e., more accurate) estimate of the plane based on this larger collection of points.

In one embodiment, confidence/reliability information associated with 3D point cloud data is received. This additional information may be leveraged with the 3D point cloud data to infer the reliability for 3D points' measurements. For example, the planes extraction algorithm described above may be adapted by allowing the 3D points with higher reliability to contribute more into the estimation of the planes. The sampling method in RANSAC may be biased to sample more from the more reliable 3D points. Furthermore, weighted least squares may be utilized rather than just least squares to estimate the planes' parameters. The weights would be proportional or an increasing function of the reliability scores of the 3D points.

In one embodiment, color information may be used to more accurately extract planes from 3D point cloud data. For example, both color information and the pixels distance may be combined to form the similarity distance of the region growing process described above. In this embodiment, 3D points that are within the same plane, are close in pixels distance and have similar colors (i.e., correspond to the same colored pixels in pre-stored images) will tend to be assigned to the same planar segment.

It is to be understood that the planar segments extracted from the 3D point cloud data form a rough 3D model of the pre-stored image data. This data may be used to extract a planar segment from the captured image data. Thus, the planar segments in the 3D model may be processed (i.e., integrated) with the captured image data and the pre-stored image data, thereby making it possible to register captured image data with the rough 3D model.

The registration of the rough 3D model allows multiple applications to project data within the respective planar segments (i.e., static images and video). In other words, the user may take an image with the mobile computing device and register it in the correct perspective in the model either on a mobile computing device or in on the desktop. Similarly with video image data, the registered the live view may be augmented in real time with additional information, such as text, images or videos, or some 3D structure, added in the correct perspective (as described for example, in FIG. 1).

In one embodiment, a mobile computing device utilizes system components and applications (e.g., the Global Positioning System (GPS) sensors, cellular or WiFi network connections, orientation sensors) to narrow down the device's location and the view angle of its image sensor. On the rough 3D model side, location and orientation information, along with related pre-stored image data (i.e., reference models) of the approximate location whose views are close to the approximate view, may be utilized to extract visual features from these images. Thus, the above processing generates planar segments with corresponding visual features, i.e., the reference models to be used by the registration processes.

Figure 8:
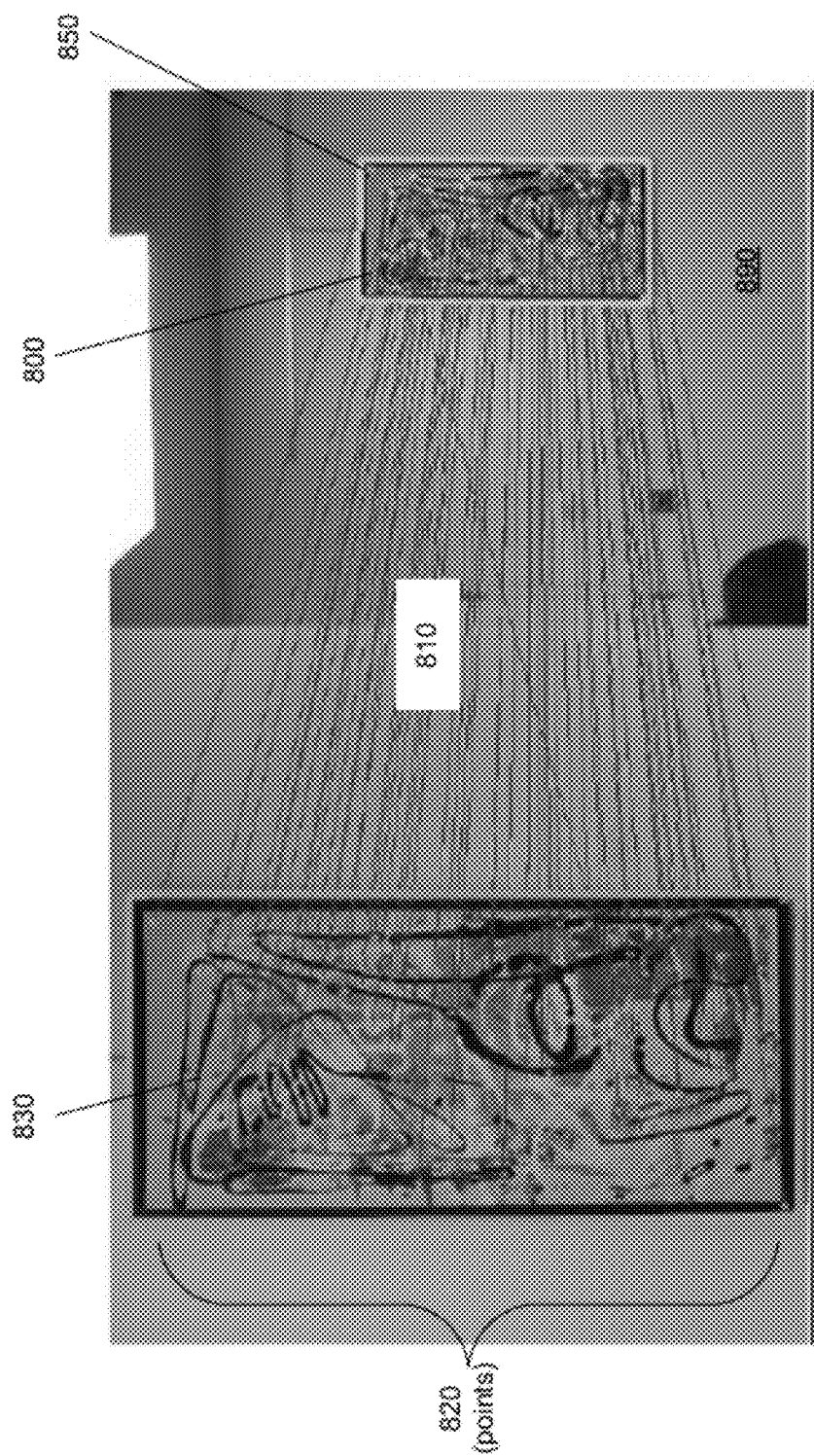
FIG. 8 illustrates visual feature matching and planar segment extraction according to an embodiment of the invention.

In one embodiment, the visual features are extracted from the image or the video frame on the mobile device and are matched to the visual features in the reference models (i.e., pre-stored images). FIG. 8 illustrates this type of matching.

Multiple homographies 810 are estimated from the points' correspondences 820 of pre-stored image 830 of object 800 in captured image 890 (in this example, object 800 is a painting on a wall). In this example, the assumption of a homography transform is valid because of the planar structure assumed in the scene and of object 800. Next, each homography matrix is decomposed into the image sensor rotation and translation parameters. These individual parameters may be combined to obtain one less noisy version of the rotation and translation parameters to produce matching planar object 830.

Thus, object 800, and the perspective it was captured in by an image sensor, may be identified. Related image data may be displayed within planar segment 850 corresponding to the object (i.e., an icon, text data, image data as described above).

Figure 9:
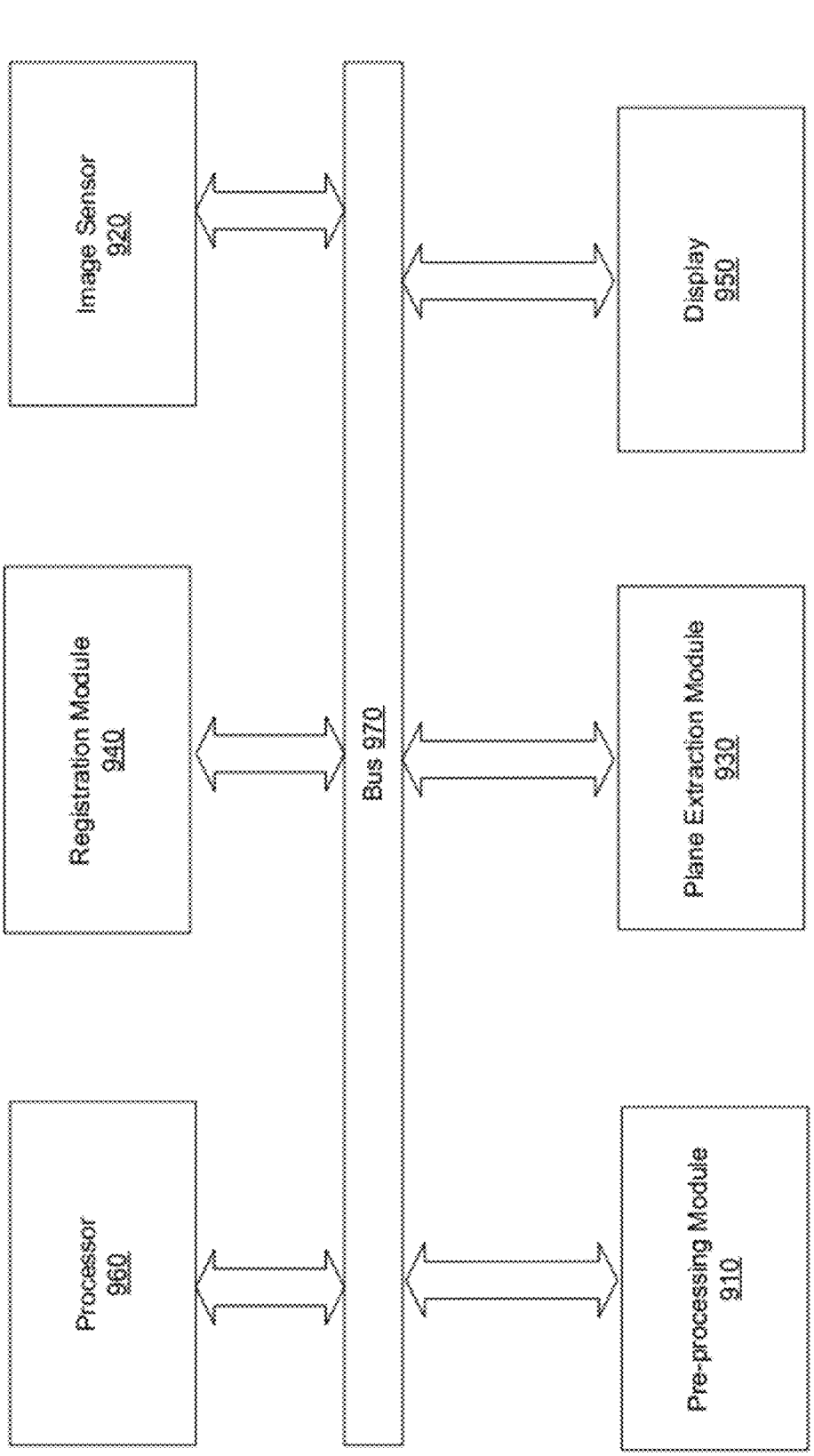
FIG. 9 is a block diagram of a system that may include an embodiment of the invention.

FIG. 9 is a block diagram of a system that may include an embodiment of the invention. System 900 may include pre-processing module 910 to execute the operations involving pre-stored images and 3D point cloud data to generate planar segments as described above. System 900 may further include image sensor 920 to capture image data as described above.

Plane extraction module 930 may process the pre-stored images, the captured images and their related planar segments to extract a plane related to an object, as described above. Registration module 940 may augment the captured image data with associated content within the extracted planar segment as described above. The augmented image data may be displayed on display 950.

In this embodiment, modules 910, 930 and 940 are executed via processor 960. All components of system 900 described above may be operatively coupled via bus 970. It is to be understood that the various modules described in FIG. 9 may all be included in a mobile computing device, or separately in various locations (i.e., any or all of the modules in FIG. 9 may be included in a server interfaced with a mobile computer device to provide "backend processing.") Furthermore, it is to be understood the operations related to the described modules are an example embodiment only, and that any operations described above may be executed via multiple devices operatively coupled together.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. An article of manufacture comprising a non-transitory machine-readable storage medium that provides instructions that, if executed by the machine, will cause the machine to perform operations comprising:

processing a first image data and 3D point cloud data of objects included in the first image data to extract a 3D data mask of an object included in the first image data from the 3D point cloud data, wherein the 3D data mask comprises less data than the 3D point cloud data of the objects included in the first image data;

generating a planar segment related to the object as captured in a second image data from a real time view of the object based, at least in part, on the second image data, the first image data and the 3D data mask, the second image data captured via an image sensor included in a mobile computing device, the second image data having the object, the planar segment geometrically consistent and within the object as it appears in the second image data and comprising a plurality of clusters, including a first cluster corresponding to the object and a second cluster corresponding to a second co-planar object; and augmenting, geometrically consistent with the planar segment and within the first cluster, the real-time view of the object with content associated with the object, the content to include static image data or video image data.

2. The article of manufacture of claim 1, wherein processing the first image data and the 3D point cloud data to extract the 3D data mask includes determining the shape and orientation of the 3D data mask based on metadata associated with the first image data, the metadata having geographical information of the first image data or data related to the object captured in the first image data.

3. The article of manufacture of claim 1, wherein generating the planar segment related to the object as captured in the second image data further includes matching the planar segment with the object captured in the second image data based on color data of the object captured in the first image data.

4. The article of manufacture of claim 1 wherein processing the 3D point cloud data to extract the 3D data mask further includes downsampling the 3D point cloud data.

5. The article of manufacture of claim 1, wherein processing the first image data and the 3D point cloud data to extract the 3D data mask from the 3D point cloud data is further based on reliability data associated with data points of the 3D point cloud data.

6. The article of manufacture of claim 1, wherein the 3D point cloud data includes
   a first set of 3D point cloud data captured from a first viewpoint; and
   a second set of 3D point cloud data captured from a second viewpoint.

7. The article of manufacture of claim 6, wherein processing the first image data and the 3D point cloud data to extract the 3D data mask from the 3D point cloud data includes
   processing the first set of 3D point cloud data and the first image data to extract a first initial planar segment;
   processing the second set of 3D point cloud data and the first image data to extract a second initial planar segment; and
   combining the first and second initial planar segments to form the 3D data mask.

8. A system comprising:
   at least one processor;
   a display;
   software to be executed via the processor(s) to
      process a first image data and 3D point cloud data of objects included in the first image data to extract a 3D data mask of an object included in the first image data from the 3D point cloud data; wherein the 3D data mask comprises less data than the 3D point cloud data of the objects included in the first image data,
      generate a planar segment related to the object as captured in a second image data from a real time view of the object based, at least in part, on the second image data, the first image data and the 3D data mask, the planar segment geometrically consistent and within the object as it appears in the second image data and comprising a plurality of clusters, including a first cluster corresponding to the object and a second cluster corresponding to a second co-planar object,
      augment, geometrically consistent with the planar segment and within the first cluster, the real-time view of the object with content associated with the object, the content to include static image data or video image data,
      display the real-time view of the object with the augmented content associated with the object on the display; and
   an image sensor to capture the real-time view of the object, including the second image data having the object.

9. The system of claim 8, wherein processing the first image data and the 3D point cloud data to extract the 3D data mask includes determining the shape and orientation of the 3D data mask based on metadata associated with the first image data, the metadata to include geographical information of the first image data or data related to the object captured in the first image data.

10. The system of claim 8, wherein generating the planar segment further includes matching the planar segment with the object captured in the second image data based on color data of the object captured in the first image data.

11. The system of claim 8 wherein processing the 3D point cloud data to extract the 3D data mask further includes downsampling the 3D point cloud data.

12. The system of claim 8, wherein processing the first image data and the 3D point cloud data to extract the 3D data mask from the 3D point cloud data is further based on reliability data associated with data points of the 3D point cloud data.

13. The system of claim 8, wherein the 3D point cloud data includes
   a first set of 3D point cloud data captured from a first viewpoint; and
   a second set of 3D point cloud data captured from a second viewpoint.

14. The system of claim 13, wherein processing the first image data and the 3D point cloud data to extract the 3D data mask from the 3D point cloud data includes
   processing the first set of 3D point cloud data and the first image data to extract a first initial planar segment;
   processing the second set of 3D point cloud data and the first image data to extract a second initial planar segment; and
   combining the first and second initial planar segments to form the 3D data mask.

15. A method comprising:
   processing a first image data and 3D point cloud data of objects included in the first image data to extract a 3D data mask of an object included in the first image data from the 3D point cloud data, wherein the 3D data mask comprises less data than the 3D point cloud data of the objects included in the first image data;
   receiving a second image data from a real-time view of the object captured via an image sensor included in a mobile computing device, the second image data to include the object;
   generating a planar segment related to the object as captured in a second image data from a real time view of the object based, at least in part, on the second image data, the first image data and the 3D data mask, the planar segment geometrically consistent and within the object as it appears in the second image data and comprising a plurality of clusters, including a first cluster corresponding to the object and a second cluster corresponding to a second co-planar object; and
   augmenting, geometrically consistent with the planar segment and within the first cluster, the real-time view of the object with content associated with the object, the content to include static image data or video image data.

16. The method of claim 15, wherein processing the first image data and the 3D point cloud data to extract the 3D data mask includes determining the shape and orientation of the 3D data mask based on metadata associated with the first image data, the metadata having geographical information of the first image data or data related to the object captured in the first image data.

17. The method of claim 15, wherein generating the planar segment related to the object as captured in the second image data further includes matching the planar segment with the object captured in the second image data based on color data of the object captured in the first image data.

18. The method of claim 15, wherein processing the 3D point cloud data to extract the 3D data mask further includes downsampling the 3D point cloud data.

19. The method of claim 15, wherein processing the first image data and the 3D point cloud data to extract the 3D data mask from the 3D point cloud data is further based on reliability data associated with data points of the 3D point cloud data.

20. The method of claim 15, wherein the 3D point cloud data includes
   a first set of 3D point cloud data captured from a first viewpoint; and
   a second set of 3D point cloud data captured from a second viewpoint.

21. The method of claim 16, wherein generating the planar segment related to the object as captured in the second image data includes:
   determining, from the first image data and from the geographical information of the first image data, that the object comprises a building; and
   generating a non-rectangular planar segment as a rectangular segment in response to determining the object comprises a building.

22. The method of claim 21, wherein the 3D data mask is to only include horizontal or vertical planes in response to determining the object comprises a building.

* * * * *